United States Patent [19]

Rubin

[11] 4,058,056
[45] Nov. 15, 1977

[54] MICROPROCESSOR CONTROLLED CARD READER/PRINTER

[75] Inventor: Irwin Rubin, Oxnard, Calif.

[73] Assignee: Sensor Technology, Inc., Chatsworth, Calif.

[21] Appl. No.: 698,268

[22] Filed: June 21, 1976

[51] Int. Cl.² .............................................. B41J 1/22
[52] U.S. Cl. ................................. 101/93.19; 101/91; 235/432; 235/487
[58] Field of Search ......... 101/91, 93.18, 93.19–93.21, 101/233, 242; 197/17, 19, 20; 235/61.9 R, 61.12 R, 61.12 M; 360/101

[56] References Cited

U.S. PATENT DOCUMENTS

| | | | |
|---|---|---|---|
| 3,037,447 | 6/1962 | Gonzalez et al. | 101/91 |
| 3,294,956 | 12/1966 | Jenkins et al. | 235/61.9 |
| 3,465,866 | 9/1969 | Gehring et al. | 197/20 |
| 3,650,204 | 3/1972 | Burger et al. | 101/91 X |
| 3,659,524 | 5/1972 | Beery et al. | 101/93.19 |
| 3,790,757 | 2/1974 | Shaw | 197/20 X |
| 3,973,486 | 8/1976 | Pylant | 101/93.19 |
| 3,978,964 | 9/1976 | Kwan | 235/61.12 M X |

OTHER PUBLICATIONS

IBM Tech. Disclosure Bulletin, vol. 13, No. 11, "Sensing Holes and Marks", G. Crovatto, 4/1971, p. 3561.

*Primary Examiner*—Edward M. Coven
*Attorney, Agent, or Firm*—Flam & Flam

[57] ABSTRACT

In this full duplex card reader/printer, a transport mechanism carries a card first past a read head at a constant rate and then incrementally past a printer. Under microprocessor control a message is printed on the card which is responsive to data read from the same card. A first transducer associated with the drive transport mechanism provides "read sprocket" pulses that are utilized by the microprocessor to ascertain the presence under the read head of a card data column. Stepping of the card past the printer is enabled by the microprocessor when a responsive message is ready for printing. As the card is stepped to each new print position, a "move sprocket" pulse is transmitted to the microprocessor. The microprocessor then compares the next message character with the character available for printing, as indicated by a set of pulses supplied from the printer. When these are the same, the microprocessor generates a command to print the character.

17 Claims, 11 Drawing Figures

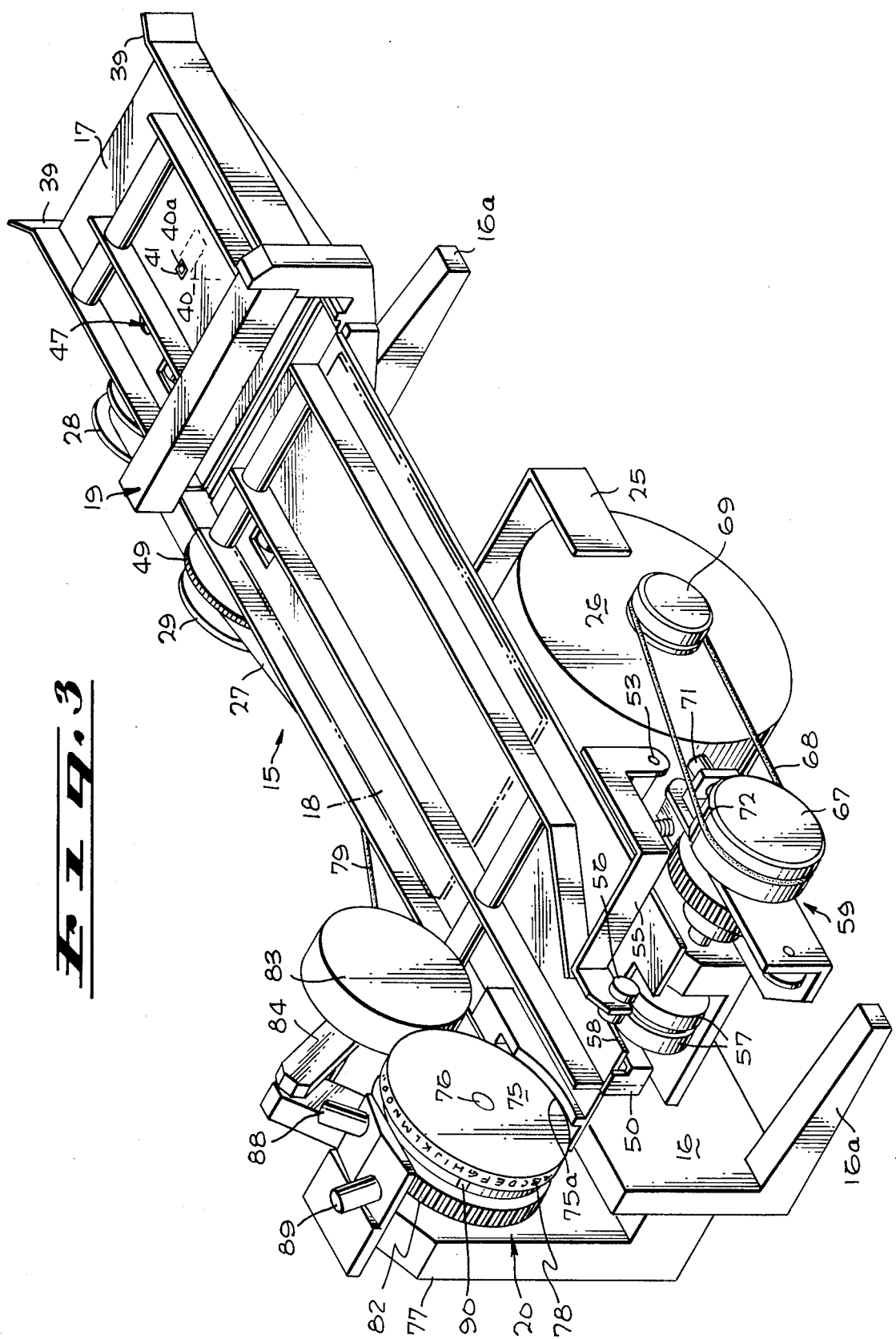

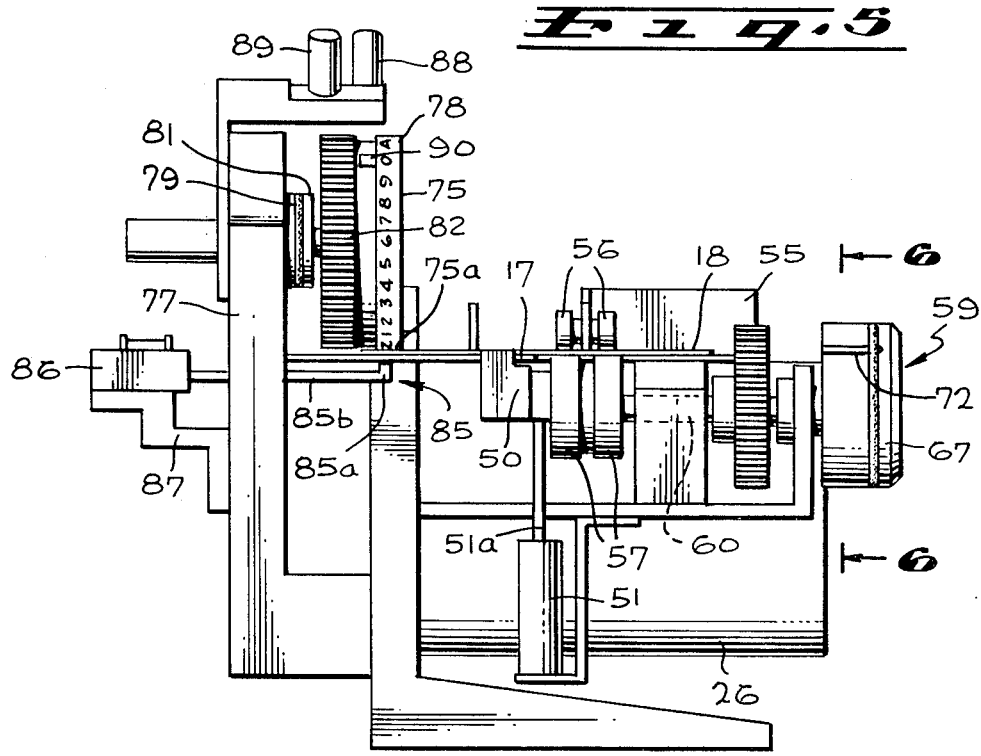
Fig. 5
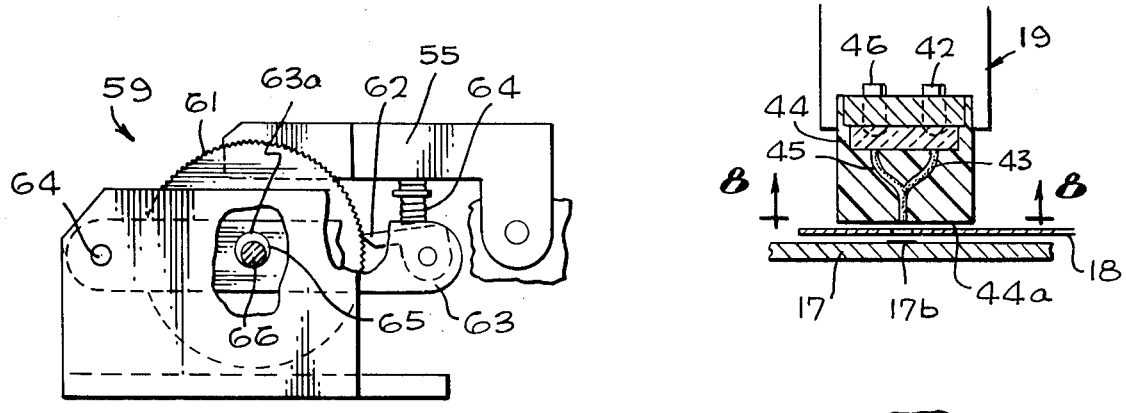
Fig. 6
Fig. 7
Fig. 8

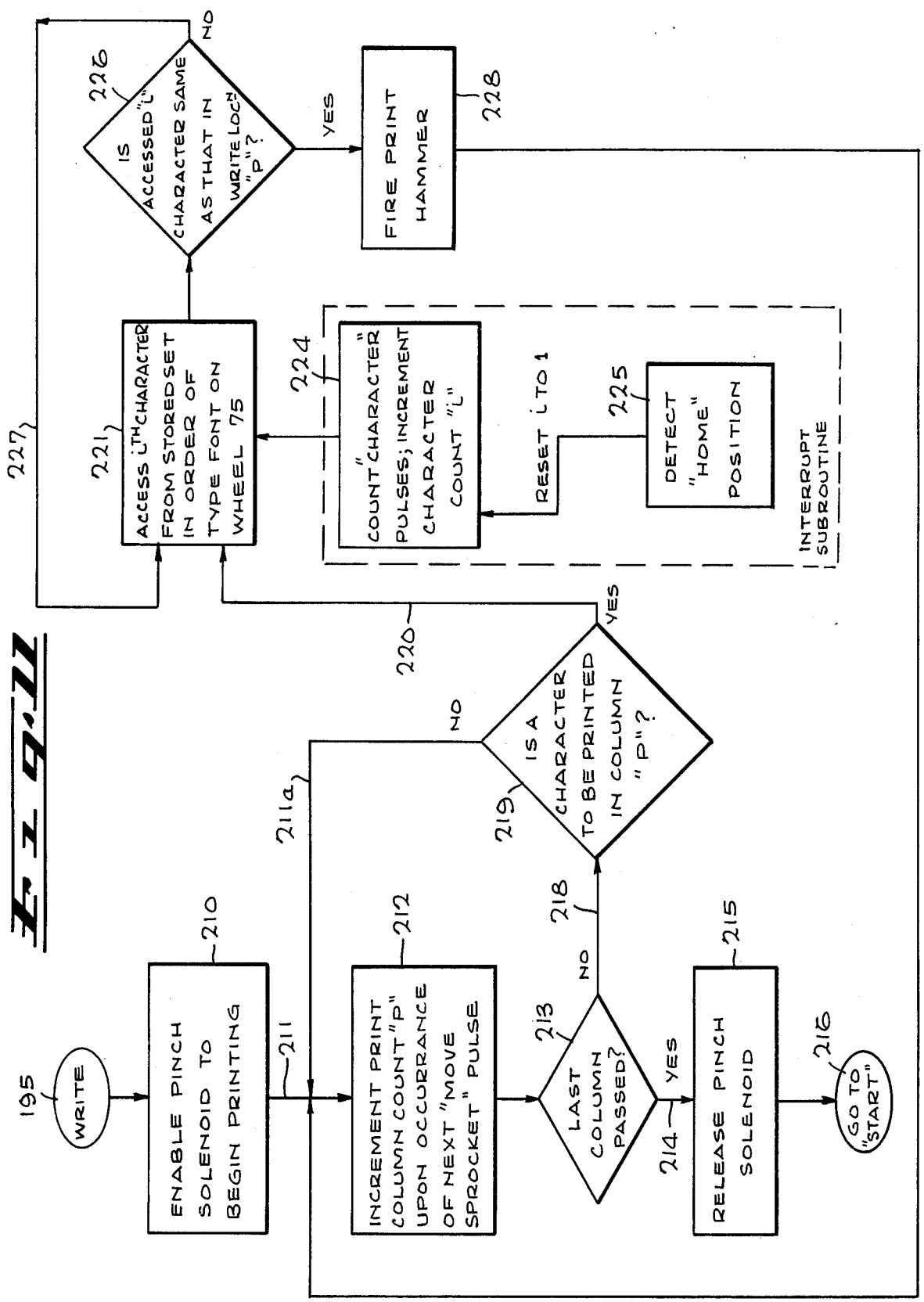

MICROPROCESSOR CONTROLLED CARD READER/PRINTER

BACKGROUND OF THE INVENTION

1. Field of the Invention

The present invention relates to a card reader/printer capable of full duplex mark sense card reading and printing under microprocessor control.

2. Description of the Prior Art

The need exists for a low priced full duplex card reader/printer to serve as an input/output device for data processing systems in which input-data-responsive messages are printed. An example of the usefullness of such a device is in an inventory control system. Here, the user might have an individual card on which he can indicate the quantity of a certain item currently in stock. As this card is read into the system, a responsive message is written onto the same card which includes (1) a print-out of this current quantity, thereby providing immediate verification that the correct data has been entered, and (2) a printed indication of the item designation, the number of days supply remaining, and an indication that the item should be reordered.

In the past, considerable equipment was required to accomplish these tasks. For example, a typical prior art system required that each inventory entry be written on a data sheet which was then transferred to card format by a key punch operator using a card punch/verifier apparatus. The punched card then was fed into a card reader for data entry into the computor. The responsive message, if any, was provided as an entry on a printed data output sheet, or as a separately punched card. In both instances, there was considerable delay between input and output, and correlation between the data entry and the responsive output was difficult. In the case of a print-out, the user would have to scan many entries to find that one related to a certain product. In the case of punched card output, it was necessary to use a device which printed on the card the specific data punched therein. Again, additional equipment and time delay was involved. An object of the present system is to provide a full duplex card reader/printer which overcomes these shortcomings. One objective is to provide a reader that is capable of sensing both punched holes and opaque marks placed on the card. In this way, the data entry can be made directly onto the card, without the need for first marking a data sheet entry that is subsequently key punched. Thus, in an inventory system, a card can be partially prepunched to indicate a certain item. The person taking the inventory then can mark the current quantity directly onto the remaining portion of the card, using a marker pen or pencil.

A further object of the present invention is to provide a card reader/printer in which the printed message (a) can correspond to the data marked or punched on the card, so as to provide a verification function, (b) can be totally independent of the data entered on the card, or (c) can consist of a message that is generated in response to the data entered on the card. Another object of the present invention is to provide such a card reader/printer which operates under microprocessor control. In the illustrative inventory control system, the present invention may be programmed to print both a verification of the entered stock item and current quantity, and a dataresponsive message indicating the number of days supply remaining, together with an indication as to whether the product should be reordered.

Still a further object of the present invention is to provide a microprocessor-controlled card reader/printer that is capable of interfacing with another computer or data processing system. In the case of inventory control, the invention may interface with a larger computer used to perform the actual inventory accounting system. On-line operation is possible, so that data entered from the reader portion of the invention may be supplied via the microprocessor to the master system. Responsive data then can be relayed back for direct print-out by the reader/printer on the same data entry card. As an example of the usefulness of such an arrangement, the master system may keep track of the lead time required for the reorder of each item. This may change from day to day, depending on delays at the supplier, material availability and so forth. Thus, when a particular inventory entry card indicates e.g., that a 10 day supply of the item remains, the master computer may ascertain that eight days are required to reorder the item. The computer may then cause a responsive message to be printed directly onto the data card, indicating that the item must be ordered within the next two days.

SUMMARY OF THE INVENTION

These and other objectives are achieved by providing a card reader/printer capable of full duplex operation under microprocessor control. The reader/printer comprises a card transport mechanism which moves each card passed a read head capable of sensing either holes or opaque marks in each card column. The card then is transported to a printer, the leading edge of the card reaching the printer only after the entire card has passed the read head, so that all of the data has been entered into the associated microprocessor system.

Data is printed on the card under microprocessor control. Appropriate programming is employed so as to permit (a) print-out of the exact data read from the card, (b) print-out of a message that is responsive to, but different from, the data read from the card, (c) print-out of a totally unrelated message, or (d) any combination of these. A stop mechanism is provided which holds the card in position to be printed, but which disables the printing operation, until an appropriate message is ready for printing. In certain modes of operation, e.g., data verification, printing may start as soon as the card reaches the printer. In other modes of operation, as for example where a delay is encountered in obtaining access to or responsive data from an associated computer system, the card will be stopped until the data to be printed out is available.

In an illustrative embodiment, the printer comprises a rotating, inked print wheel which sequentially exposes an entire character set to be printed at each card position. A hammer, situated on the opposite side of the card, strikes the card against the rotating print wheel when the desired character character is in alignment with the card. A stepping mechanism transports the card passed the print wheel in spaced increments equal to the separation between adjacent printed characters. The stepper is disabled when the card is stopped prior to receipt of the data to be printed.

BRIEF DESCRIPTION OF THE DRAWINGS

A detailed description of the invention will be made with reference to the accompanying drawings wherein like numerals designate corresponding parts in the several figures.

FIG. 3 is a front pictorial view.

FIG. 5 is an end view of the card reader/printer as seen along the line 5—5 of FIG. 4.

FIG. 6 is a partial view, partly broken away and in section, of the card stepper mechanism, as seen along the line 6—6 of FIG. 5.

FIG. 7 is a partial transverse sectional view of the read head, as seen along the line 7—7 of FIG. 4.

FIG. 8 is a partial bottom view of the read head, as seen along the line 8—8 of FIG. 7.

FIGS. 10 and 11 together comprise a flow chart of a typical microprocessor program useful to control the inventive reader/printer.

DESCRIPTION OF THE PREFERRED EMBODIMENT

Figure 2:
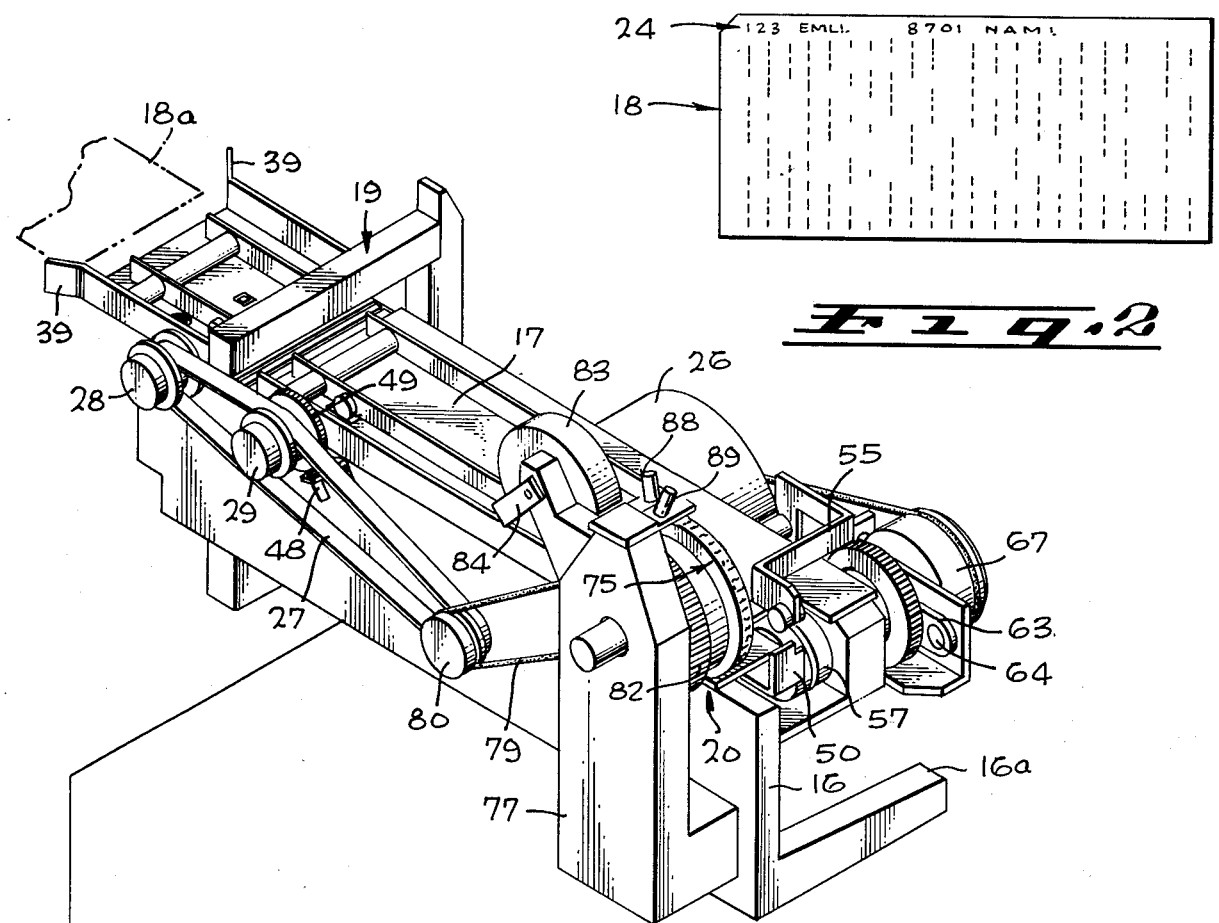
FIG. 2 is a pictorial view of a card which can be read and printed using the apparatus of FIG. 1.

The following detailed description is of the best presently contemplated mode of carrying out the invention. This description is not to be taken in a limiting sense, but is made merely for the purpose of illustrating the general principles of the invention since the scope of the invention is best defined by the appended claims.

Referring to FIGS. 1 through 4, the inventive card reader/printer 15 has a frame 16 supported by legs 16a. Attached to the frame 16 is a table 17 which supports a card 18 as it is transported first past a read head 19 and then past a printer 20. Data read from the card 18 is supplied from the read head 19 via a reader/printer interface adaptor 21 and an input/output device 22 to an associated microprocessor 23. This is appropriately programmed so as to generate, in response to data read from the card 18, print commands which direct the printer 20 to print a message 24 (FIG. 2) onto the card 18.

Transport of the card 18 is powered by a motor 26 mounted by a bracket 25 to the frame 16. As evident in FIGS. 1 and 4, a belt 27 connects the motor shaft 26a to a pair of pulleys 28, 29 that are connected by shafts 30, 31 to a respective pair of card drive wheels 32, 33. These wheels 32, 33 project through openings 34, 35 in the table 17 and come into friction-engaging contact with the underside of the card 18 that is being transported through the reader/printer 15. The card is held down by a set 37 of rails 37a–37d supported just above the table 17 by horizontal mounts 38. A set of rollers 32a, 33a attached to the rails 37 counter the pressure of the drive wheels 32, 33 and permit the wheels to drive the card 18 at a continuous rate past the read head 19.

Figure 1:
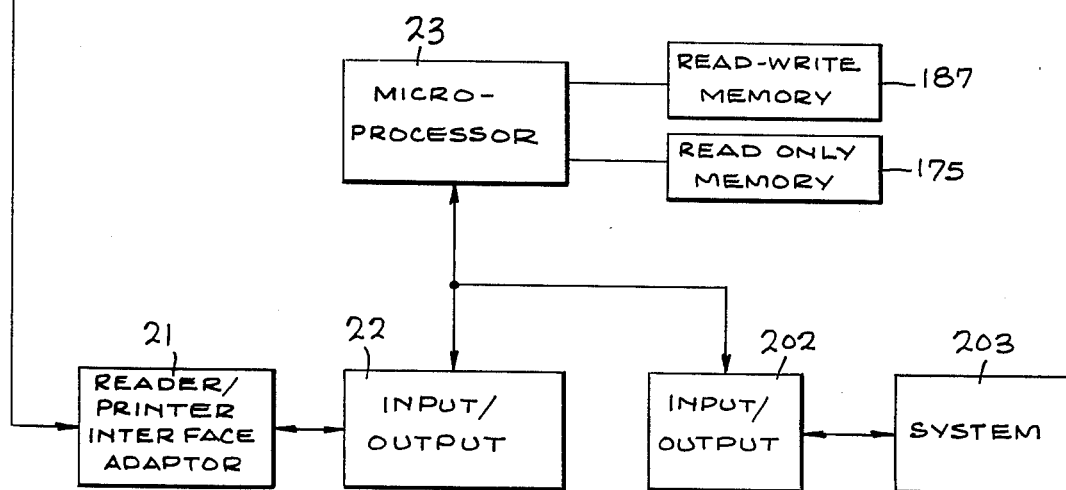
FIG. 1 illustrates the inventive card reader/printer system and includes a rear pictorial view of the reader/printer mechanism and an electrical block diagram of the associated microprocessor and interface circuitry.

Operation of the card reader/printer 15 is initiated by inserting a card onto the end 17a of the table 17 as shown in phantom at 18a in FIG. 1. A pair of flared rails 39 guide the card insertion. The leading edge of the card 18a actuates a switch 40 that has an operating lever 40a which projects through an opening 41 in the table 17. Closure of the switch 40 energizes the motor 26, thereby causing rotation of the drive wheels 32 and 33 to transport the card past the read head 19.

The read head 19 contains a plurality (typically 12, to read Hollerith-coded cards) of light emitting diodes 42 (FIG. 7). Light from each is transmitted via optical fibers 43 to the bottom 44a of a block 44 that supports the LED's 42. Reflected light enters other optical fibers 45 and is conducted to a photodetector 46 also mounted within the block 44. The outputs of all of the photo-sensors 46 are amplified and supplied to the interface adaptor circuitry 21 as discussed below in conjunction with FIG. 9. Advantageously, the upper surface 17b (FIG. 7) of the table 17 beneath the read head 19 is opaque, so that if the card 18 contains punched holes, light from the fibers 43 will not be reflected from the surface 17a, and the absence of reflected light will be sensed by the photodetector 46 to indicate the presence of a hole. With this arrangement, if the card 18 is not punched, but contains marks made with a pen or dark pencil, these too will cause less reflected light, and provide a reduced signal from the photodetector 46 indicating the presence of a mark. For either case, in the absence of a punched hole or mark, the light reflected from the white or buff-colored surface of the card 18 will cause the detector 46 to provide a signal indicating that no mark is present.

The presence of a data column beneath the read head 19 is ascertained through the use of a transducer 48 (FIGS. 1 and 4) that cooperates with a toothed disc 49 on the pulley 29. Typically, the transducer 48 includes a pair of coils, one of which is connected to a voltage source. The magnetic flux coupling the two windings is changed each time a tooth on the wheel 49 passes the transducer 48. This change in flux causes a double pulse (one positive and the other negative-going) to be generated each time a tooth of the wheel 49 passes the transducer 48. As described below (FIGS. 9 and 10) these "read sprocket" pulses from the transducer 48 are counted, beginning at detection of the leading edge of the card 18, to determine when each data column on the card is situated beneath the read head 19.

As the card 18 continues past the read head 19, the wheel 33 drives it toward the printer 20. In the event of a delay in the availability of print commands to the printer 20, the card 18 will come to rest with its leading edge abutting against a stop tab 50 (FIGS. 1 and 3–5). The card will remain stationary in this position until an approrpriate command from the microprocessor 23, supplied via the interface adaptor 21, energizes a pinch solenoid 51 which pulls the stop tab 50 downward out of the way of the card. The spacing between the drive wheel 33 and the stop tab 50 is such that the trailing edge of the card 18 is no longer in contact with the wheel 33 when the leading edge abuts against the stop tab 50. Transport of the next card past the read head 19 may be inhibited until printout of the preceeding card has been completed. To this end a shutter solenoid 47 (FIG. 4) includes a plunger 47a that projects above the table 17 to block entry of the next card until withdrawn in response to a shutter enable signal from the microprocessor 23.

The stop tab 50 is affixed to the end of an arm 52 which is mounted to a shaft 53 that is journalled through a bearing 54 mounted on the front portion of the frame 16. Also attached to the shaft 53 is an offset lever arm 55 that supports a pair of pinch wheels 56. When the stop tab 50 projects above the table 17, the pinch wheels 56 are held above the level of the table 17 in spaced relationship from a pair of stepper drive wheels 57 that project through a slot 58 in the table 17.

When the solenoid 51 is energized by receipt of an appropriate signal from the microprocessor 23, the plunger 51a is drawn downward, pulling with it the arm 52. This causes the stop tab 50 to drop below the level of the table 17, so as to permit passage of the card 18. At the same time, the arm 52 causes rotation of the shaft 53 and the lever 55 so as to lower the pinch wheels 56 into contact with the upper surface of the card 18. This pinches the card between the wheels 56 and the stepper drive wheels 57, so that the card can be advanced past the printer 20 in positional increments under control of a stepper mechanism 59 which drives the wheels 57. Printing of a single character is enabled at each incremental position of the card 18.

The stepper mechanism 59 includes a ratchet wheel 61 (FIG. 6) that is connected by a shaft 60 to the stepper drive wheels 57. A pawl 62 attached to a lever 63 engages a tooth of the wheel 61 and rotates the wheel 61 by an amount equal to the angular separation of the teeth each time that the arm 63 pivots upward about a pivotal axis 64. This causes rotation of the drive wheels 57 through a like angle. As the arm 63 pivots downward, the pawl 62 slips into the next tooth of the wheel 61, under the urging of a bias spring 64.

Figure 4:
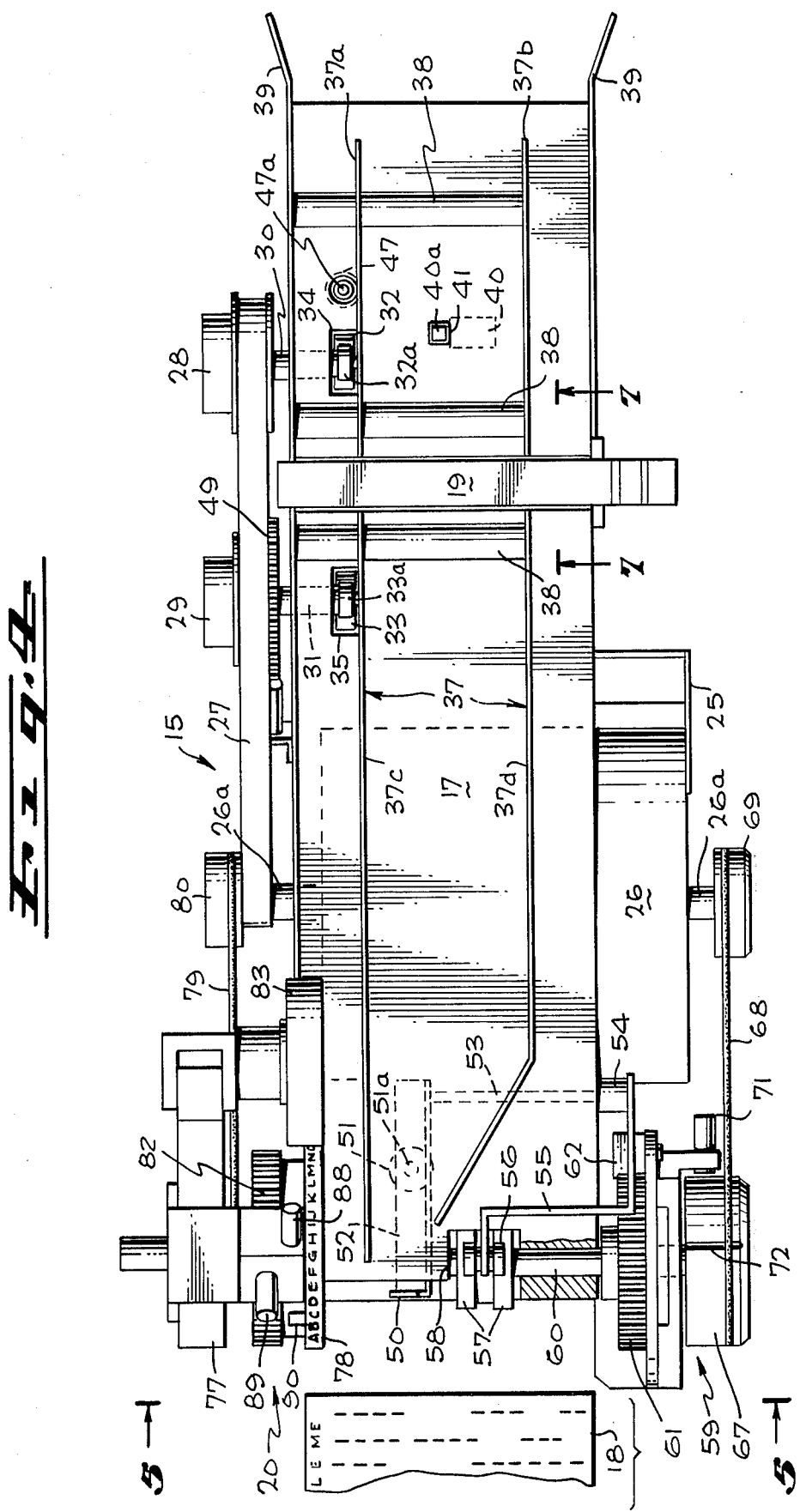
FIG. 4 is a top plan view of the card reader/printer also shown in FIG. 1.

Alternating upward and downward pivotal motion is imparted to the arm 63 by means of an offset cam 65 situated within an opening 63a in the arm 63 and affixed to the shaft 66 of a pulley 67 (FIGS. 4 and 6). The pulley 67 in turn is driven via a belt 68 connected to a pulley 69 affixed to the shaft 26a of the motor 26. With this arrangement, each revolution of the pulley 67 causes a single upward and downward pivotal movement of the arm 63, thereby causing the pawl 62 to rotate the ratchet wheel 61 by an angular amount equal to the separation between adjacent teeth. This tooth separation and the diameter of the stepper drive wheel 57 are selected so that for each such incremental motion, the card 18 is advanced a linear distance equal to the separation between adjacent printed characters. Advantageously, but not necessarily, this separation is equal to the spacing between adjacent columns of data read by the head 19. A transducer 71 (FIGS. 3 and 4) cooperates with a gap or notch 72 in the pulley 67 to produce a "move sprocket" signal indicating that the card 18 has been stepped to a new print position.

The printer 20 (FIGS. 3, 4 and 5) utilizes a type wheel 75 that is mounted to a horizontal shaft 76 which is journal-mounted to a rigid upright support 77 affixed to the frame 16. The type wheel 75 includes about its periphery a font 78 of type typically including a complete alphabet, the numerals zero through nine and certain other symbols. The type wheel 75 is continuously rotated by the motor 26. To this end, a belt 79 links a pulley 80 affixed to the motor shaft 26a to another pulley 81 (FIG. 5) affixed to the shaft 76.

The type font 78 is continously inked by an ink roller 83 that is rotationally supported by an arm 84 which itself is pivotally connected to the support 77. A spring (not shown) biases the arm 84 and the ink roller 83 into intimate contact with the type wheel 75, to ensure consistent inking of the type font 78.

The bottom 75a of the type wheel 75 is situated just above the upper surface of the card 18, as indicated in FIG. 5. Situated below the card 18, immediately underneath the bottom 75a of the type wheel 75, is a print hammer 85. The hammer head 85a is situated at the end of an arm 85b that is pivotally connected to an electromagnet 86 mounted on a bracket 87 affixed to the support 77. When the desired character on the rotating type wheel 75 is aligned with the hammer 85, the print magnet 86 is energized (by appropriate signals from the microprocessor 23). The magnet 86 causes the arm 85b rapidly to rotate upward so that the hammer head 85a strikes the card 18 against the inked type character currently positioned at the bottom 75a of the rotating type wheel 75. The ink is transferred to the card, thereby printing the character onto the upper card surface.

A pair of transducers 88 and 89 (FIGS. 3-5) are used to ascertain which character currently is available to be printed onto the card 18. The first transducer 88 detects the presence of a single tooth 90 arranged on the type wheel 75 so as to be aligned with the transducer 88 when the beginning of the type set 78 is aligned at the print position 75a. For example, the tooth 90 may be arranged to produce from the transducer 88 an output or "home" pulse each time that the letter "A" is located at the bottom 75a of the wheel 75 in position to be printed on the card 18.

The second transducer 89 operates in conjunction with a set of teeth 82 spaced about the periphery of the type wheel 75 in alignment with individual characters of the font 78. In this manner, the transducer 89 produces a single "character" pulse each time a successive character is available to be printed. The microprocessor 23 counts the number of such "character" pulses which have occured since the last occurrence of the "home" pulse, and in this manner keeps track of which character is available to be printed at any instant. A print command to the print magnet 86 is generated by the microprocessor 23 when this counting process indicates that the type face for the desired character is aligned with the hammer 85 in position to be printed on the card 18.

Figure 9:
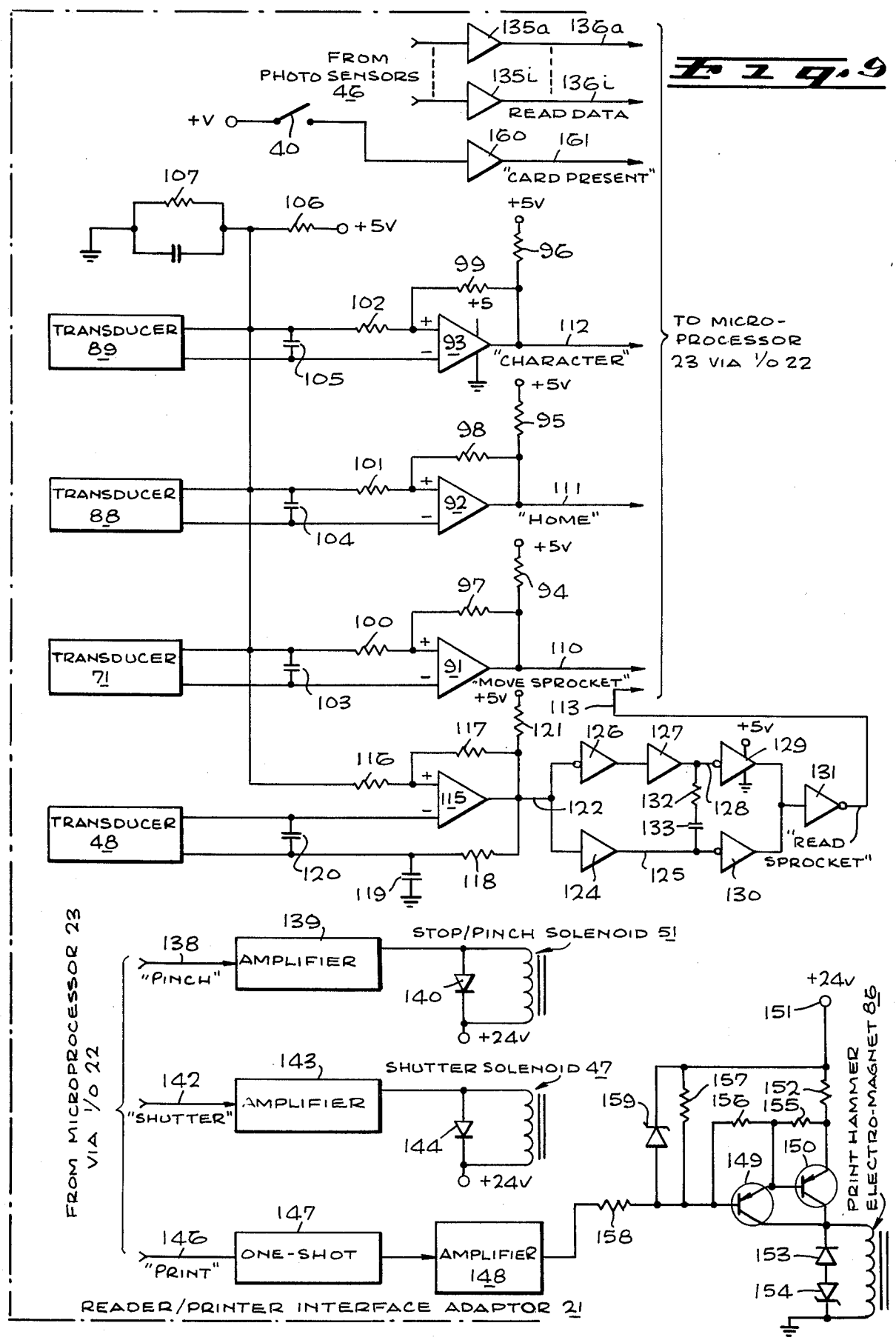
FIG. 9 is an electrical schematic diagram of the reader/printer interface adaptor circuitry used in conjunction with the system of FIG. 1.

Circuit details of the reader/printer interface adaptor 21 are shown in FIG. 9. Referring thereto, associated with each of the transducers 71, 88 and 89 is a respective operational amplifier 91, 92, 93 each having a load register 94, 95, 96, a feedback resistor 97, 98, 99, an input resistor 100, 101, 102 and an input bypass capacitor 103, 104, 105. The input bias voltage is supplied to all of the amplifiers 91-93 from a voltage divider comprising a pair of resistors 106, 107 and a bypass capacitor 108. An output from the transducer 71 produces a "move sprocket" pulse on a line 110 each time the card 18 is advanced to a new print position, as described above. Once during each revolution of the type wheel 75, the transducer 88 provides a single output which is amplified by the amplifier 92 to provide a "home" pulse on a line 111. Similarly, during each revolution of the type wheel 75, the transducer 89 provides an output pulse each time another character is in position to be printed; these pulses are amplified by the amplifier 93 and supplied as the "character" signals on a line 112.

The "read sprocket" signals generated in response to the transducer 48 output are provided on a line 113. As described above, two such "read sprocket" pulses occur each time a single tooth of the wheel 49 passes the transducer 48. The approximately sinusoidal output of the transducer 48 is converted to a square wave using an operational amplifier 115 connected as shown in FIG. 9. The non-inverting (+) input of the amplifier 115 is not connected to the transducer 48, but rather is connected to a dc bias source via a resistor 116, and is connected to the amplifier output via a feedback resistor 117. The transducer 48 is connected to the inverting (−) input of the amplifier 115, to a feedback resistor 118, and to a bypass capacitor 119, the other end of which is connected to ground. A capacitor 120 shunts the transducer 48. A load resistor 121 is connected between the output terminal 122 and a positive dc voltage source. With this arrangement, a square wave signal is produced at the terminal 122 as the toothed wheel 49 rotates past the transducer 48.

A pair of "read sprocket" pulses are generated for each cycle of the square wave on the line 122 by supplying this square wave to two separate amplifier channels. In the first channel, the signal is amplified by a single amplifier 124 and provided to a line 125. In the second channel, the square wave signal is amplified successively by a pair of amplifiers 126 and 127, and supplied to a line 128. Each of the amplifiers 124, 126 and 127 has a slight delay. Since the signal in the second channel goes through two amplifiers 126, 127, the square wave appearing at the line 128 will be delayed slightly with respect to the signal on the line 125 which has passed through only the one amplifier 124. A set of amplifiers 129, 130, 131 are connected to compare the square wave signals on the lines 125 and 128, and to produce an output on the line 113 only where these two square waves do not overlap. Because of the slight delay of the square wave on the line 128 with respect to that on the line 125, there will be a no-overlap condition at the beginning and at the end of each square wave half-cycle. As a result, a pair of pulses will be produced on the line 113 for each cycle of the square wave on the line 122. A series connected resistor 132 and capacitor 133 link the inputs of the amplifiers 129 and 130.

The control signals on the lines 110 through 113 are supplied from the reader/printer interface adaptor 21 to the microprocessor 23 via an input/output circuit 22. The circuit 22 performs the necessary signal level conversions, timing and other operations appropriate to provide input to the microprocessor 23. In a typical embodiment, the microprocessor may comprise a Motorola type M6800 processor which is available commercially. In such instance, the input/output circuit 22 may comprise a Motorola type 6820 peripheral interface adaptor which is sold commercially as a single integrated circuit chip.

Data read from the card 18 is supplied to the microprocessor 23 via the I/O circuit 22 from a set of amplifiers 135a through 135i each associated with a respective photodetector 46 (FIG. 7) in the read head 19. Although these amplifiers 135a–135i are shown as part of the interface adaptor 21 in FIG. 9, they may be physically located immediately adjacent to the photodetectors 46 within the read head 19 itself. The read data is transmitted from these amplifiers 135a–135i via a set of data lines 136a through 136i.

Still referring to FIG. 9, certain control signals are received from the microprocessor 23 via the I/O circuit 22. These include the "pinch" signal that is used to control the solenoid 51 which retracts the stop tab 50 and drops the pinch wheels 56 into contact with the card 18. The "pinch" signal is received on a line 138 and supplied via an amplifier 139 and an arc suppression diode 140 to the solenoid 51. Similarly, the "shutter" signal is supplied from a line 142 via an amplifier 143 and an arc suppression diode 144 to the shutter solenoid 47 (FIG. 4).

The "print" command used to energize the print hammer electromagnet 86 (FIG. 5) is supplied via a line 146 and a monostable multivibrator ("one-shot") 147 to an amplifier 148. The output of the amplifier 148 is used to turn on a Darlington circuit consisting of a pair of transistors 149, 150 which connect voltage from a source 151 via a resistor 152 to the electromagnet 86. A diode 153 and a Zener diode 154 connected in series across the electromagnet 86 provide arc suppression and protect the transistors 149, 150 from current surges when the field in the electromagnet 86 collapses. A set of resistors 155–168 and a zener diode 159 complete the drive circuit to the electromagnet 86.

Operation of the card reader/printer is initiated when a "card present" signal is supplied to the microprocessor 23 upon closure of the switch 40 (FIGS. 3, 4 and 9). The "card present" signal is amplified by an amplifier 160 and supplied to the input/output circuit 22 via a line 161.

Advantageously, the card reader/printer 15 is controlled by the microprocessor 23 which itself carries out a program stored in a read only memory 175. Such an operational program is typified by the flow chart of FIGS. 10 and 11.

Figure 10:
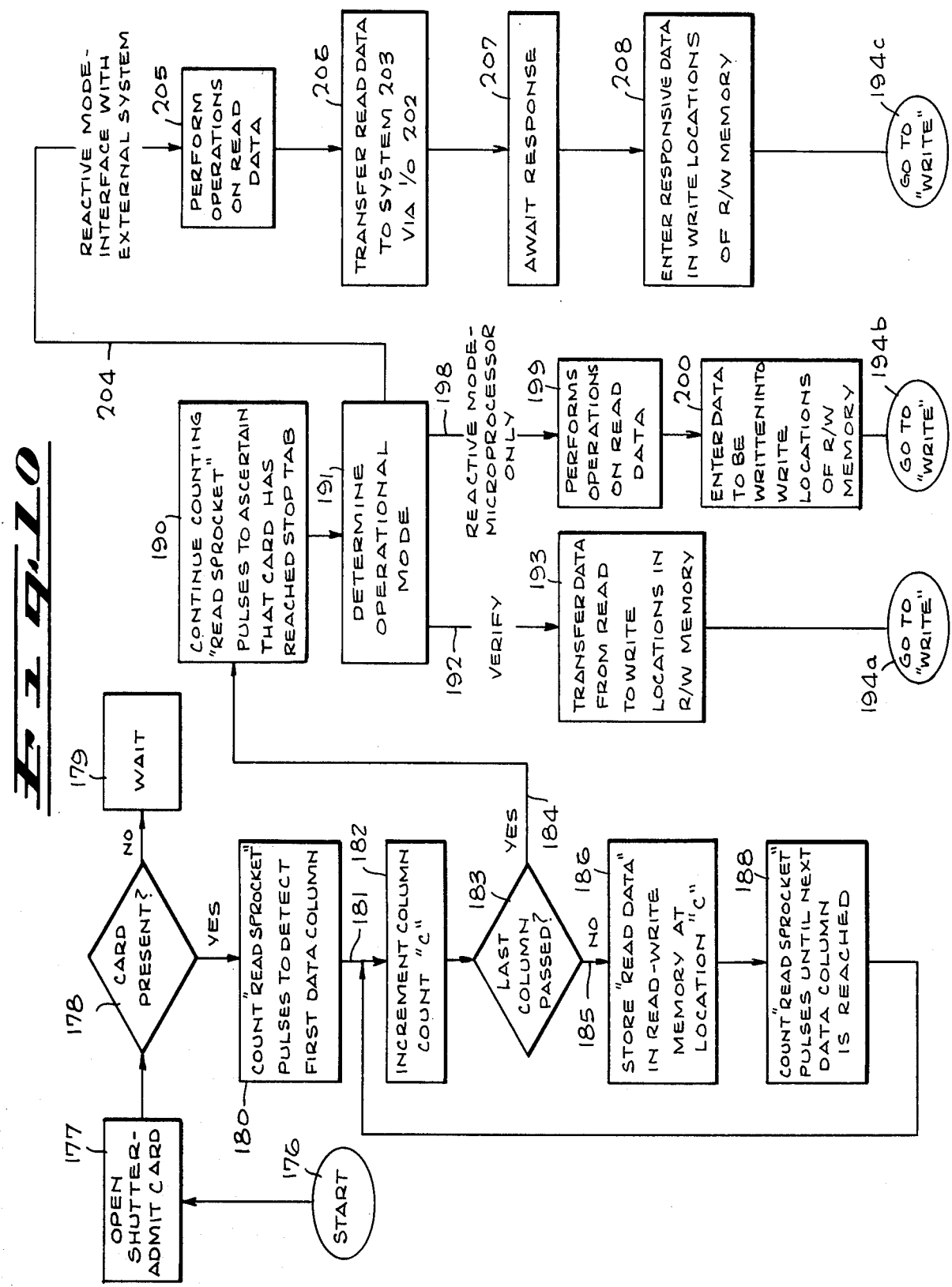

Referring to FIG. 10, the program starts (block 176) by directing (block 177) the microprocessor 123 to supply a "shutter" pulse to the line 142 (FIG. 9) which causes the plunger 47a (FIGS. 3 and 4) to retract, so that a card can be fed into the reader/printer 15. If no card is present, the absence of a signal on the line 161 (FIG. 9) causes the program (block 178) to wait (block 179). When a "card present" signal occurs, the program branches to block 180 and the microprocessor 23 begins to count the "read sprocket" pulses supplied on the line 113.

The location of the first data column on the card 18 is detected in the following way. Before the leading edge of the card reaches the read head 19, all of the photosensors 46 are exposed to the opaque surface 17b (FIG. 7) and hence produce the equivalent of a "mark" output. As soon as the leading edge of the card 18 reaches the read head 19, light is reflected back to all of the photosensors 46, causing all of them to produce a "no-mark" signal. When this transition occurs, counting of the "read sprocket" pulses is initiated in the microprocessor 23. Since each such pulse corresponds to a fixed increment of travel of the card 18, the first data column will be present under the read head 19 after a certain fixed number of "read sprocket" pulses have been counted. When this count is reached, the program (FIG. 10) advances via a branch 181 to block 182. A count is kept of which data column currently is being read from the card 18. This column is designated "c". When the block 182 first is entered at the start of each card, the count "c" is reset to one. On each successive entry of the block 182 the count "c" is incremented by 1. Next (block 183) the value "c" is examined to determine if it is greater than the number of columns on the card 18. If so, the branch 184 is taken to the block 190. If there are still additional columns to be read, the branch 185 is taken to the block 186.

Data read from the card column currently beneath the read head 19 is stored in an input data portion of a read/write memory 187 (FIG. 1) associated with the microprocessor 23. The data is stored into a location having an address corresponding to the column count "c" of the column being read. As a result, when the entire card 18 has been read in, the data from the card will be stored in column-corresponding locations of the memory 187. After each column data is stored, the program advances to block 188. Additional "read sprocket" pulses are counted to ascertain when the next data column has been reached. When this occurs, block 182 again is reentered via the branch 181.

After all of the data has been from the card 18, counting of the "read sprocket" pulses continues (block 190) until a certain count is reached which indicates that the card has been transported to the initial print position with its leading edge abutting against the stop tab 50. The program now makes a determination (block 191) as to the desired operational mode. Thereafter, the data to be printed onto the card 18 is obtained and entered into write locations in the read/write memory 187.

In the "verify" mode, the program (FIG. 10) follows a branch 192 to block 193. In this mode, the same data that is read from the card 18 is printed back onto that card. To accomplish this, the data from the read portion of the memory 187 is transferred in the write location of the same memory, in identical order. The program then branches (block 194a) to the beginning (block 195) of the WRITE program (FIG. 11).

In a second operational mode (herein designated "reactive mode-microprocessor only"), the data to be printed on the card 18 is different from, but may be related to the data read from the card. For example, if certain card columns indicate the quantities of various items, these quantities may be printed out in the corresponding columns, and a total may be printed out in some other column. For this mode, the program follows the branch 198 to the block 199.

The microprocessor 23 next performs the appropriate operations on the data read from the card 18 and stored in the memory 187. In the example just given, this operation would include addition of the indicated quantities to obtain a total of all items specified. The resultant to be printed onto the card 18 is stored (block 200) in the write locations of the memory 187. The program then branches (194b) to the WRITE block 195.

In still another mode (herein designated "reactive mode-interface with external system"), data is transmitted from the microprocessor 23 via an input/output circuit 202 (FIG. 1) to an external data processing system 203. For example, the system 203 may be a remote inventory control system incorporating a large scale computer. The system 203 may generate a message that is to be printed on the card 18 in response to a certain set of data read from that card and supplied to the system 203 via the microprocessor 23. This mode is entered via the program branch 204 (FIG. 10) leading to the block 205.

The microprocessor 23 itself may perform certain operations on the data read from the card 18 prior to transfer to the system 203. For example, the card data may be in Hollerith code. This may be translated to ASCII or EBCDIC code prior to transmission (block 206) to the system 203.

Next, the microprocessor 23 awaits (block 207) a response from the system 203. The message received back from that system is entered (block 208) into the write locations of the memory 187 for printout onto the card 18. The program then branches (194c) to the WRITE block 195.

At the beginning of the WRITE program (FIG. 11), a "pinch" signal is transmitted (block 210) via the line 138 (FIG. 9) to cause retraction of the stop tab 50 and depression of the pinch wheels 56 (FIG. 3) into contact with the card 18. This conditions the reader/printer 15 to step the card 18 to successive print locations. The program then advances via a branch 211 to block 212.

A count is kept (block 212) of the column on the card 18 currently positioned under the type wheel 75. This column count "p" is set to 1 the first time the block 212 is entered. The count "p" is incremented by 1 upon receipt of each "move sprocket" pulse from the line 110 (FIG. 9). The rotational rate of the type wheel 75 is such that a complete set of characters is available for printing at each card location in less time than that taken between two consecutive "move sprocket" pulses.

A determination is made (block 213) as to whether the last print location has been passed. If so, the printing operation is complete, and the program advances via a branch 214 to a block 215. The pinch solenoid is released by terminating the "pinch" signal on the line 138. The program then goes via a branch 216 back to the START block 176 in preparation for receipt of the next card.

If another column is to be printed, the program goes from block 213 via a branch 218 (FIG. 11) to a block 219. A determination is made as to whether a character is to be printed in the present column "p". This is done by looking at the contents of the $p^{th}$ write location in the memory 187. If no character is stored in this location, none is to be printed on the card, and the program goes back via branch 211a to the block 212. If a character is present in this $p^{th}$ storage location, the program continues via a branch 220 to block 221.

During the foregoing program operation, the microprocessor 23 is also operating to keep a count of which character is currently available to be printed. This is accomplished by incrementing a counter each time a "character" pulse is received on the line 112. This counter is reset to 1 each time that a "home" pulse is received (block 225) from the line 111. The contents $i$ of this counter then indicates which character type is currently situated at the bottom 75a of the wheel 75 in position to be printed.

Stored in consecutive locations of a portion of the read only memory 175 is a set of characters arranged in the same order as the type font 78 on the wheel 75. At block 221 the $i^{th}$ character is accessed from this memory. A determination is made (block 226) as to whether the accessed $i^{th}$ character corresponds to the character which is to be printed in the current column "p". If not, the program waits (branch 227) until the next $(i+1)$ character is accessed (block 221). Eventually, the desired character type on the wheel 75 will be in position to be printed in the current $p^{th}$ column. When this occurs, the corresponding $i^{th}$ character will be accessed (block 221) from the memory 175 and the coincidence will be detected at block 226. When this occurs, the microprocessor 23 will generate (block 228) a "print" signal on the line 146 (FIG. 9) to fire the print hammer 85 (FIG. 5). The desired character will be printed onto the card 18 in the column "p". The WRITE program (FIG. 11) then will branch back via the branch 211 to the block 212. The card then is stepped to the next $(p+1)$ position in preparation for printing of the next character. This operation continues until all of the columns have been printed and the program terminates via the branch 216.

Intending to claim all novel, useful and unobvious features, shown or described, the inventor makes the following claims:

1. A card reader/printer system comprising:
   a stationary read head for sensing marks on said card,
   a printer for printing characters onto said card, a transport mechanism including:
  first transport means for transporting said card first past said read head at a uniform rate, said read head sensing said marks as said card is transported past said read head, and
  second transport means for then transporting said card incrementally past said printer in steps equal to the distance between adjacent print positions so that consecutive print positions on said card are aligned with said printer, said printer comprising a motor driven, substantially continuously rotating type wheel containing a font of type, the rotational rate of said type wheel being sufficiently great so that an entire set of type characters in said font is successively available to be printed at each print position during the dwell time of said card between consecutive transport steps imparted by said second transport means, and
a processor for directing said printer to print on said card during said incremental transport a message that is responsive to data read from said, said processor including:
  first processor means, coupled to said first transport means and to said read head, for entering data read from said card into a memory in storage locations corresponding to the locations of marks on said card,
  second processor means for providing, in response to said stored read data, a set of write data to be printed onto said card, and for storing this write data in storage locations of a memory corresponding to the locations in which said write data is to be printed on said card, and
  third processor means, conditioned for operation by each successive transport step of said second transport means, for comparing each type wheel character in position to be printed with the write data character stored in the memory location corresponding to the current print location of said card, and for directing printing of said character when the compared characters are the same.

2. A card reader/printer system according to claim 1 wherein said transport mechanism includes a motor, and wherein said first transport means includes:
at least one drive wheel continuously, rotationally driven by said motor, and
first transducer means for providing a series of "read sprocket" pulses each representing rotation of said drive wheel through a fixed angle, and wherein
said processor ascertains the location of marks to be read from said card in response to said "read sprocket" pulses.

3. A cardreader/printer system according to claim 1 wherein said second transport means includes:
second transducer means for providing a "move sprocket" pulse for each transport step of said card past said printer, and wherein
said processor ascertains the current print position of said card in response to said "move sprocket" pulses.

4. A cardreader/printer system comprising:
a stationary read head for sensing marks located in columns on said card,
a printer for printing characters onto said card,
a transport mechanism including:
  a motor,
  first transport means for transporting said card first past said read head at a uniform rate, said read head sensing said marks as said card is transported past said read head, and
  second transport means for then transporting said card incrementally past said printer in steps equal to the distance between adjacent print positions so that consecutive print positions on said card are aligned with said printer, and
a processor including circuitry for directing said printer to print a message on said card during said incremental transport, wherein said first transport means includes:
  at least one drive wheel continuously, rotationally driven by said motor, and
  first transducer means for providing a series of "read sprocket" pulses each representing rotation of said drive wheel through a fixed angle, and wherein
said processor ascertains the location of marks to be read from said card in response to said "read sprocket" pulses, and wherein said processor also includes:
  means for detecting passage of the leading edge of said card past said read head by sensing the light reflected from said card,
  means for counting the number of "read sprocket" pulses provided by said first transducer means beginning upon detection of said leading edge by said means for detecting, and
  means for ascertaining the column location of marks on said card by determining when the number of "read sprocket" pulses counted by said means for counting equals certain fixed numbers designating the spacing from said card leading edge of each column of marks.

5. A card reader/printer system comprising:
a stationary read head for sensing marks on said card,
a printer for printing characters onto said card,
a transport mechanism including:
  first transport means for transporting said card first past said read head at a uniform rate, said read head sensing said marks as said card is transported past said read head, and
  second transport means for then transporting said card incrementally past said printer in steps equal to the distance between adjacent print positions so that consecutive print positions on said card are aligned with said printer,
a processor including circuitry connected to said printer for directing said printer to print a message on said card during said incremental transport,
said printer comprising a motor driven, substantially continuously rotating type wheel containing a font of type, the rotational rate of said type wheel being sufficiently great so that an entire set of type characters in said font is successively available to be printed at each print position during the dwell time of said card between consecutive transport steps imparted by said second transport means, said rotating type wheel including:
  first transducer means for providing a "home" pulse each time the beginning of said set of type characters in said font is in position to be printed,
  second transducer means for providing a "character" pulse as each successive type character is in position to be printed, and wherein said processor also has circuit means connected to said first and second transducer means for ascertaining which character is currently available to be printed in response to said "home" and "character" pulses.

6. A card reader/printer system according to claim 5 wherein said second transport means comprises:
third transducer means for providing a "move sprocket" pulse for each transport step of said card past said printer, said processor ascertaining the current print position of said card in response to said "move sprocket" pulses, wherein
said processor stores said responsive message in a memory in storage locations corresponding to the print positions in which each message character is to be printed, and wherein
said processor circuitry includes comparator means, operative for each current print position, for comparing the message character to be printed in that print position with the character currently available to be printed, as ascertained in response to said "home" and "character" pulses, said comparator means providing a print signal to said printer to direct printing of that message character when the compared characters are the same.

7. A card reader/printer system intended for operation with an external data processing system, comprising:
a stationary read head for sensing marks on said card,
a printer for printing characters onto said card,
a transport mechanism including:
first transport means for transporting said card first past said read head at a uniform rate, said read head sensing said marks as said card is transported past said read head, and
second transport means for then transporting said card incrementally past said printer in steps equal to the distance between adjacent print positions so that consecutive print positions on said card are aligned with said printer,
a processor including circuitry for directing said printer to print on said card during said incremental transport a message that is responsive to data read from said card, and
means, cooperating with said processor, for supplying data read from said card by said read head to said external system, said external system then providing to said processor a responsive message to be printed onto said card,
said transport mechanism including stop means for inhibiting transport of said card past said printer after completion of transport past said read head, said processor directing said stop means to inhibit such transport past said printer between the time that said read data is supplied to said external system and the time that said responsive message is received back from said external system, said processor then releasing said stop means to enable transport of the card past said printer and printout of said responsive message onto said card.

8. A card reader/printer comprising:
a stationary read head for sensing marks on said card,
a printer for printing any of a set of characters on said card, and
a transport mechanism having:
first means for transporting a card continuously past said read head, said marks being sensed as said card is transported past said read head, and
second means, operative after said card has been transported completely past said read head, for stepping said card past said printer to successive stepped card locations, said printer being capable of printing any character in said set on said card at each stepped card location,
stop means for stopping the transport of said card when it has reached said printer and for disabling said second means so that said card is not stepped past said printer, and
print enable means for releasing said stop means and for enabling said second means so that said card can be stepped past said printer.

9. A card reader/printer according to claim 8 wherein said card is transported along a table having rail means for guiding said card, said transport mechanism including a motor, said first means for transporting comprising at least one drive wheel continuously rotated by said motor and situated frictionally to drive said card past said read head, said stop means comprising a tab projecting above said table to block movement of said card said tab being situated at a sufficient distance from said read head and from said drive wheel so that when said card abuts against said stop tab, said card will have completely passed said read head and be out of contact with said drive wheel.

10. A card reader/printer according to claim 9 wherein said second means for stepping includes:
a stepper wheel situated to engage said card when said card is in position to be printed,
means, connected to said motor, for rotating said stepper wheel incrementally through a fixed angle corresponding to the distance between adjacent print positions on said card, and
a pinch wheel situated, when enabled, to press said card into engagement with said stepper wheel, and wherein,
said print enable means causes said pinch wheel to press said card into engagement with said stepper wheel so that said card will thereby be stepped past said printer.

11. A card reader/printer according to claim 10 wherein said printer comprises:
a type wheel situated adjacent said table in position to print characters onto said card, said type wheel containing a font of type including a complete set of characters, said type wheel being rotated continuously at a rate sufficient so that a complete set of characters go past a print position while said card dwells at that print position between being stepped by said stepper wheel, and
a print hammer for striking said card into printing contact with said type wheel when a desired character is in position to be printed.

12. A card reader/printer according to claim 11 together with:
first transducer means for producing a "move sprocket" pulse each time said stepper wheel moves said card into another print position,
second transducer means for producing a "home" pulse each time said type wheel rotates to a position at which the first character in said type font set of characters is in position to be printed,
third transducer means for producing a "character" pulse each time another character on said type wheel is in position to be printed, and
electromagnet means for causing said print hammer to strike said card.

13. A card reader/printer according to claim 12 together with a microprocessor that receives the data read from said card and produces in response thereto a message to be printed on said card, said microprocessor generating, in response to said "move sprocket", "home" and "character" pulses, appropriate "print" signals to energize said print hammer electromagnet means so as to cause printing of said read-data-responsive message on said card.

14. A card reader/printer according to claim 9 together with:
  a toothed wheel mounted for rotation with said drive wheel,
  a magnetic transducer mounted in proximity to said toothed wheel so that passage of each tooth in said wheel past said magnetic transducer causes an output thereof, and
  circuit means, responsive to the output of said magnetic transducer for producing a series of "read sprocket" pulses spaced in time in accordance with the transport of said card a uniform distance along said table.

15. A card reader/printer according to claim 14 wherein said magnetic transducer produces a generally sinusoidal output as each tooth passes, and wherein said circuit means comprises:
  a first circuit for converting said sinusoidal output to a rectangular wave signal, and
  second circuit means for producing a spaced pair of pulses from said rectangular wave signal comprising:
    a first channel in which said rectangular wave signal is amplified with a first delay,
    a second channel in which said rectangular wave signal is amplified with a second delay different from said first delay, and
    a differential circuit for producing an output only during the time that the differently delayed square wave signals from said first and second channels do not overlap.

16. A card reader/printer according to claim 14 together with microprocessor means, receiving and counting said "read sprocket" pulses, for determining when each column of marks on said card is in position to be sensed by said read head.

17. A card reader/printer according to claim 8 together with processor means, receiving the output of said read head, for directing said printer to print a message that is responsive to all of the data read from said card via said read head.

* * * * *